US012650960B1

(12) United States Patent
Nahulan et al.

(10) Patent No.: US 12,650,960 B1
(45) Date of Patent: Jun. 9, 2026

(54) SYSTEM AND METHOD FOR AI-ENHANCED OPTIMIZATION OF COMPUTER SYSTEM MIGRATION

(71) Applicant: International Business Machines Corporation, Armonk, NY (US)

(72) Inventors: Jessica Nahulan, Vaughan (CA);
Jeremy R. Fox, Georgetown, TX (US);
Tiberiu Suto, Franklin, NY (US);
Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/087,445

(22) Filed: Mar. 21, 2025

(51) Int. Cl.
| | |
|---|---|
| *G06F 16/21* | (2019.01) |
| *G06F 9/451* | (2018.01) |
| *G06F 16/215* | (2019.01) |
| *G06Q 10/0635* | (2023.01) |

(52) U.S. Cl.
CPC ............ *G06F 16/214* (2019.01); *G06F 9/453* (2018.02); *G06F 16/215* (2019.01); *G06Q 10/0635* (2013.01)

(58) Field of Classification Search
CPC ...... G06F 16/214; G06F 9/453; G06F 16/215; G06Q 10/0635
USPC ........................................................ 707/609
See application file for complete search history.

(56) References Cited

U.S. PATENT DOCUMENTS

| | | | |
|---|---|---|---|
| 11,031,124 | B2 | 6/2021 | Johnson et al. |
| 2007/0100712 | A1 | 5/2007 | Kilpatrick et al. |
| 2018/0308160 | A1 | 10/2018 | Liu |
| 2020/0210921 | A1 | 7/2020 | Gibrekhterman et al. |
| 2021/0398023 | A1* | 12/2021 | Lin ......................... G06N 20/10 |
| 2022/0277017 | A1* | 9/2022 | Kabra ................... G06F 16/213 |
| 2023/0120977 | A1 | 4/2023 | Rau et al. |
| 2023/0393832 | A1* | 12/2023 | Touati ..................... H04L 67/10 |

FOREIGN PATENT DOCUMENTS

| | | |
|---|---|---|
| CN | 114723180 A | 7/2022 |

OTHER PUBLICATIONS

IBM, "IBM Engineering Lifecycle Management", available online at <https://web.archive.org/web/20240315093633/https://www.ibm.com/products/engineering-lifecycle-management>, Mar. 15, 2024, 5 pages.

(Continued)

*Primary Examiner* — Michael Pham
(74) *Attorney, Agent, or Firm* — Onyx IP Group

(57) ABSTRACT

A system may obtain, via a network and from a plurality of sources, structured data and unstructured data for a product migration to a new product. The system may standardize the structured data and the unstructured data to obtain standardized data. The system may generate a data model by processing the standardized data. The system may utilize a machine learning model to determine migration scenarios for the product migration and to forecast outcomes for the migration scenarios based on the data model. The system may provide a plurality of refined predictive insights to a strategy optimization component. The system may configure a group of computing devices, from a plurality of computing devices, for the product migration.

20 Claims, 9 Drawing Sheets

(56) References Cited

OTHER PUBLICATIONS

IBM, "IBM Planning Analytics", available online at <https://web.archive.org/web/20240719174438/https://www.ibm.com/products/planning-analytics>, Jul. 19, 2024, 10 pages.
Ramasankar Molleti, "Leverage Ai To Improve Cloud Modernization", Educational Administration: Theory and Practice, 29(2), 2023, pp. 539-546.

* cited by examiner

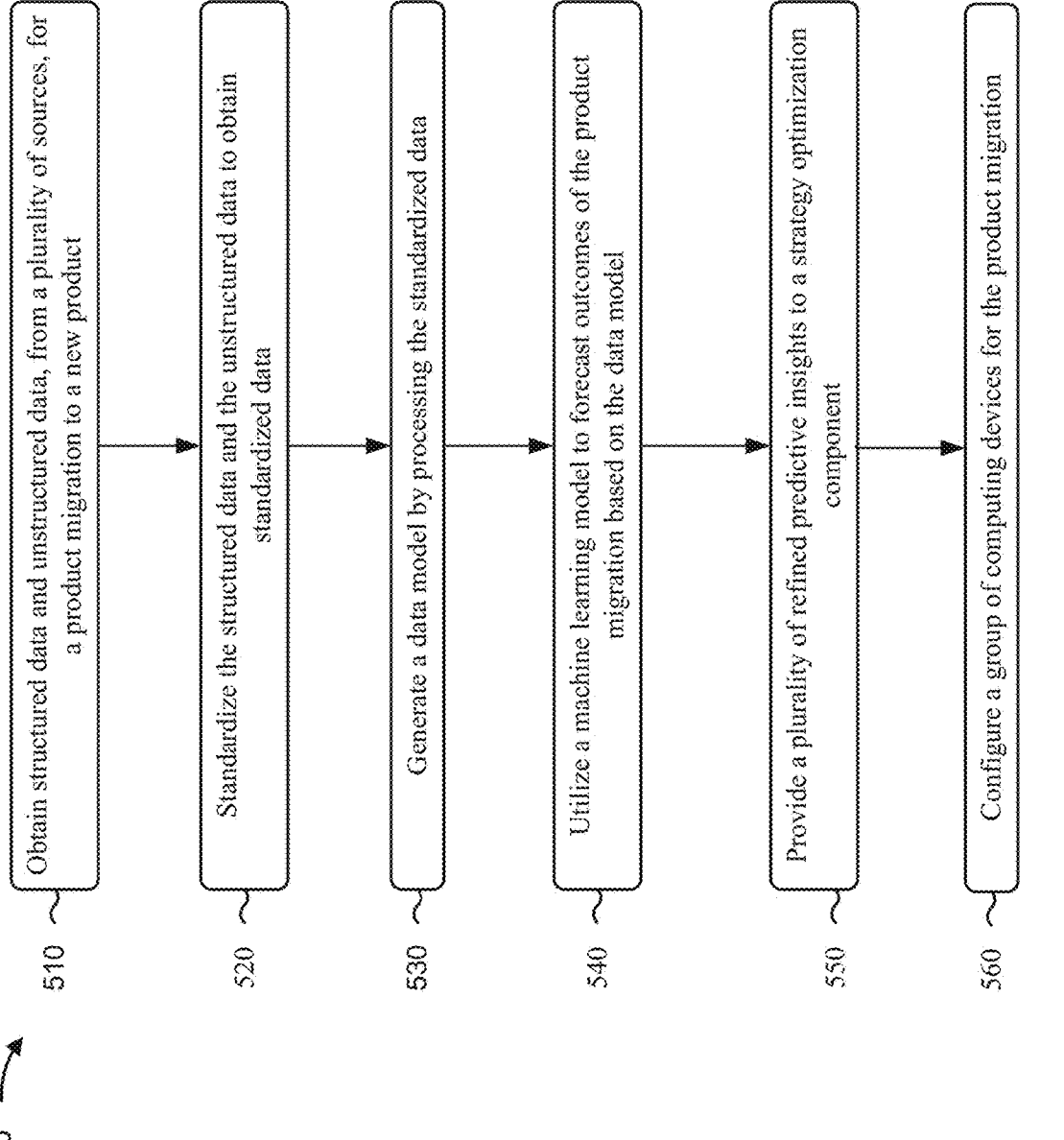

510    Obtain structured data and unstructured data, from a plurality of sources, for a product migration to a new product 520    Standardize the structured data and the unstructured data to obtain standardized data 530    Generate a data model by processing the standardized data 540    Utilize a machine learning model to forecast outcomes of the product migration based on the data model 550    Provide a plurality of refined predictive insights to a strategy optimization component 560    Configure a group of computing devices for the product migration

SYSTEM AND METHOD FOR AI-ENHANCED OPTIMIZATION OF COMPUTER SYSTEM MIGRATION

BACKGROUND

The present invention relates to a product migration, and for example, relates to a computer system migration using a machine learning model.

A computer system migration (or computer migration) may refer to a process of moving data and computer programs from one computer system to another computer system or from a computer system to a cloud system. The computer system migration may be performed as part of changing a computer, changing an operating system, changing a software platform, among other examples.

SUMMARY

A computer-implemented method for providing content, the computer-implemented method comprising: obtaining, via a network and from a plurality of sources, structured data and unstructured data for a product migration to a new product, wherein the structured data and the unstructured data are obtained, using a data ingestion unit, to predict a success of the product migration; standardizing the structured data and the unstructured data to obtain standardized data, wherein standardizing the structured data and the unstructured data includes standardizing formats, addressing missing values, and removing duplicate data; generating a data model by processing the standardized data; utilizing a machine learning model to determine migration scenarios for the product migration and to forecast outcomes for the migration scenarios based on the data model; providing a plurality of refined predictive insights to a strategy optimization component, wherein the strategy optimization component determines migration strategies for the migration scenarios based on potential future states associated with the product migration; and configuring a group of computing devices, from a plurality of computing devices, for the product migration, wherein the group of computing devices is selected based on the migration strategies.

A computer program product comprising: one or more computer-readable storage media; and program instructions stored on the one or more computer readable storage media to perform operations comprising: obtaining, via a network and from a plurality of sources, structured data and unstructured data for a product migration to a new product; standardizing the structured data and the unstructured data to obtain standardized data; generating a data model by processing the standardized data; utilizing a machine learning model to forecast outcomes of the product migration based on the data model; providing a plurality of refined predictive insights to a strategy optimization component, wherein the strategy optimization component determines migration strategies based on potential future states associated with the product migration; and configuring a group of computing devices, from a plurality of computing devices, for the product migration, wherein the group of computing devices is selected based on the migration strategies.

A computer system comprising: one or more computer-readable storage media; a processor set; and program instructions stored on the one or more computer-readable storage media to cause the processor set to perform operations comprising: establishing a data ingestion framework, for a product migration to a new product, to obtain structured data and unstructured data from a plurality of sources, wherein the structured data and the unstructured data are obtained to predict a success of the product migration; standardizing the structured data and the unstructured data to obtain standardized data, wherein standardizing the structured data and the unstructured data includes standardizing formats, addressing missing values, and removing duplicate data; generating a data model by processing the standardized data; utilizing a machine learning model to forecast outcomes of the product migration based on the data model; providing a plurality of refined predictive insights to a strategy optimization component, wherein the strategy optimization component determines migration places based on potential future states; and configuring a group of computing devices, from a plurality of computing devices, for the product migration.

BRIEF DESCRIPTION OF THE DRAWINGS

FIG. 5 is a flowchart of an example process associated with product migration.

DETAILED DESCRIPTION

Figure 1:
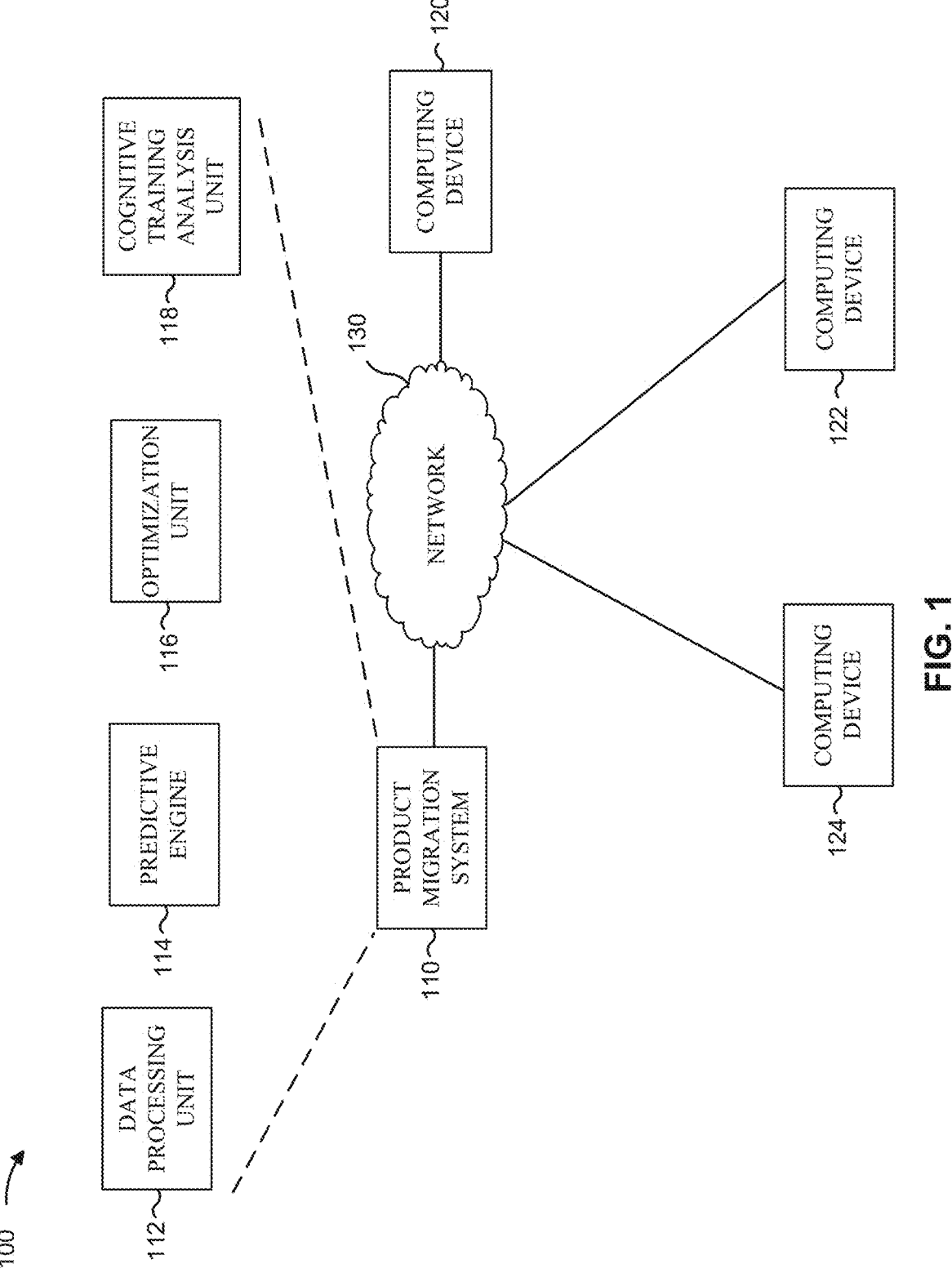
FIG. 1 illustrates a block diagram of a computing environment described herein.

The following detailed description of example implementations refers to the accompanying drawings. The same reference numbers in different drawings may identify the same or similar elements.

A computer system migration (or computer migration) may refer to a process of moving data and computer programs from one computer system to another computer system or from a computer system to a cloud system. A company may perform a computer system migration in an effort to streamline a technology stack, thereby reducing excessive consumption of storage resources, network resources, data storage resources, among other examples. For example, the company may perform the computer system migration from a legacy computer system to an intuitive and efficient computer system. The computer system migration may lead to preserving storage resources, network resources, data storage resources, among other examples.

In some situations, the company may perform the computer system migration based on directives to reduce expenses related to licensing costs of the legacy computer system, training for and adoption of the legacy computer system, decreased operational efficiency of the legacy computer system, and data-driven decisions. The strategic shift from legacy systems to more cost-effective alternatives is not always just a question of staying current with technology but usually a decisive move to optimize the balance sheet.

Computer system migration (from a legacy computer system to a new computer system) in a large company is a complex and challenging process. The process is often accompanied by disruption of productivity caused by technical issues associated with the computer system migration. The technical issues may include malfunction of the new computer system, malfunction of a machine hosting the new computer system, among other examples. The process may be accompanied costs associated with remedying the technical issues and user dissatisfaction resulting from the technical issues.

Traditional approaches to planning for a computer system migration often rely on subjective estimates and a disconnection from hidden costs outlining the true impact on the company. The subjective estimates and the disconnection from the hidden costs leads to inefficient resource allocation, such as inefficient network resources allocation, inefficient computing resources allocation, inefficient data storage resources allocation, among other examples.

Additionally the subjective estimates and the disconnection from the hidden costs lead to missed opportunities for cost savings, and potential damage to the user experience. Moreover, the subjective estimates and the disconnection from the hidden costs often slow down project timelines and hinders user efficiency due to learning curves and migration downtime. Accordingly, a technical problem of computer system migration enterprises are grappling with the substantial challenges of product migration, where the accurate prediction and management of costs, disruptions, and user (e.g., employee) retraining are hampered by legacy methodologies that often neglect to capture the full financial and operational impacts.

Implementations described herein are directed to a solution, using artificial intelligence (AI), for product migration from a current product to a new product. For example, implementations described herein are directed to an AI-powered solution to assist entities (e.g., large enterprises) with respect to product migration. As used herein, a "product migration" may refer to a personal computer (PC) migration (e.g., from one computer to another computer), a cloud migration (e.g., from a local server to a cloud environment), an application migration (e.g., from one application to another application), a database migration (e.g., from one database to another database), a data storage migration (e.g., from one data storage to another data storage), among other examples. As an example, with respect to the application migration, the product may include an e-mail system, an instant messaging/chat system, and a network security system, among other examples.

The product migration may improve an operation of a computing device that receives the product migration. For example, the application migration may improve an operation of components of the computing devices, such as a communication component and an output component described herein. For instance, the application migration may include a throughput of the computing device with respect to data packets associated with the application.

Implementations described herein use advanced data analytics, natural language processing (NLP), and machine learning algorithms to provide businesses with a comprehensive, data-driven approach to assess, plan, and execute product migration. Implementations described herein quantify all aspects of the product migration, including technical issues that may arise during the product migration, configuration of computing device undergoing the product migration and complexity of the configuration, disruption associated with performing the product migration on the computing devices, developing and customizing training for using the new product, user experience with respect to using the new product (as opposed to using the current product), product reviews of the new product and/or of the current product, licensing costs associated with the product migration, among other examples. As used herein, "advanced data analytics" may refer to AI driven aggregation and analysis of enterprise system metrics, user feedback, licensing costs, and transition risks (associated with product migrations) to generate optimized product migration strategies. Implementations described herein may use predictive modeling to forecast costs, downtime, and training needs (associated with product migrations) while continuously refining recommendations (regarding the product migrations) based on real-time feedback. In some examples, implementations described herein may utilize data processing of various kinds of complex data, ML algorithms and modeling to get deeper insights regarding the product migrations.

In some examples, the user experience may be based on skills of users with respect to using the current product and the new product and may be based on any difficulty associated with acquiring the skills for using the new product. In some examples, the product reviews of a product may be based on knowledge and expertise of a technical support group of the product. Not accounting for the skill of users and the knowledge and expertise lengthens and complicates the product migration. Accordingly, not accounting for the skill of users and the knowledge and expertise may cause an insufficient of amount of resources to be allocated for the product migration. The resources may include computing resources, network resources, storage resources, among other examples. In contrast, implementations described herein account for the skill of users and the knowledge and expertise of the technical support team. Accordingly, implementations described herein may allocate a sufficient amount of resources for the product migration.

In some examples, implementations described herein may provide a detailed breakdown of various costs associated with the current product and the new product. The various costs include cost associated with configuring the computing devices, licensing costs associated with the current product and the new product, costs associated with developing and implementing training for the new product, among other examples.

Implementations described herein also assesses how the product migration will impact end-users by identifying a number of users (e.g., of an entity, such as a company) requiring training, predicting potential issues based on historical data, and autonomously validating documented problems from other entities (e.g., from users of other companies). Implementations described herein generate multiple scenarios, for the product migration, considering various factors such as current ongoing project duration and risk, employee downtime, and a support team responsiveness of the new product. Implementations described herein may predict costs and downtime for each scenario, allowing the entity to compare and choose a most suitable option and plan product migration strategies. In some examples, different groups of machines (associated with different departments of the entities) may undergo the product migration. Implementations described herein may involve iteratively transitioning certain departments or teams at different time periods and costing a financial impact of obtaining the correlated smaller license packages.

Implementations described herein may obtain data from various sources, such as online reviews, forums, product installation videos, and feedback loops with users utilizing the new product. Implementations described herein may analyze the data, considering factors like support team responsiveness, product reliability, and user satisfaction. The data (e.g., historical data) is used to predict the success of the product migration. Implementations described herein may update generated product migration plans (or scenarios) based on a success of the smaller first employee group's transition progress and experience with a feedback loop.

Implementations described herein may involve data aggregation to collect enterprise logs, usage, support tickets, product reviews, etc. combined with NLP to extract infights on feedback and support documentation. Following data aggregation, anomaly detection and pattern recognition may be performed. The anomaly detection and pattern recognition may be performed using a trained supervised learning model (e.g., random forest or LSTM) that is trained on historical product migration failures and associated system log (e.g., log files). Implementations described herein may include validating documented problems. By validating documented problems, implementations described herein mean cross-check identified issues with external sources, such as online reviews or open issue ticket boards, and use graph based clustering to find similar failure patterns across different groups (e.g., different organizations). Additionally, NLP and sentiment analysis may be used to identify erroneous program migration scenarios and correlated scenarios which led to these issues. Models, such as LSTM, may be used to identify long term dependencies and repeated patterns that lead to failures of the product migrations. Finally, continuous reinforcement learning may be used to adjust models based on real world success rates of product migration strategies to refine predictions and improve recommended transition plans.

With respect to costing a financial impact of obtaining the correlated smaller license package, implementations described herein may identify requirements and collect usage data. First, implementations described herein may identify average of data such as active users, feature utilization and requirements from the software, and department-specific software dependencies. Available suppliers and costing options may be identified (e.g., license A covers required features A and B and costs $500). Cost analysis may involve total cost of smaller licenses in contrast with comprehensive license packages. The cost analysis may be correlated to actual usage needs (e.g., a waste of resources may occur if users in certain groups (e.g., some departments) do not need certain features till a later point in time). License scenarios may be run by simulating different license package configurations. Multiple license strategies may be run based on user roles, feature usage, team needs. Users may be categorized into license groups (full access, occasional access, full feature requiring, etc.) and cost estimates may be generated on different scenarios (e.g., where perhaps some users have full access they don't need allowing the license to be bundled in contrast with segmented and broken down into multiple smaller license packages). Cost benefit analysis may be performed for price, downtime, needs being met, product reviews, hidden costs such as retraining if switching from one license to another. The cost analysis benefit may be performed with a decision tree to determine most cost efficient license breakdown with minimal impact on productivity.

While examples herein may discuss product migration with respect to software, implementations described herein are applicable to migration with respect to hardware.

FIG. 1 illustrates a block diagram of a computing environment 100 for product migration. The computing environment 100 includes a product migration system 110, a computing device 120, a computing device 122, a computing device 124, and a network 130 connecting these components.

The product migration system 110 may include one or more computing devices that are configured for planning and execution of product migrations. Product migration system 110 may facilitate the product migration (e.g., of digital products) for an entity, such as a company or an enterprise. Product migration system 110 may analyze a variety of metrics and data sources to deliver product migration strategies customized for different groups of computer devices of different users. The product migration strategies may minimize operational disruptions (e.g., downtime of computing devices), costs (e.g., licensing costs), and enhance user experience during the product migration. In some examples, a core functionality of product migration system 110 may be derived from an integrated approach that combines data aggregation, predictive scenario simulation, and dynamic strategy optimization to cause a comprehensive decision-making process with respect to select a plan for the product migration. As used herein, a "comprehensive decision-making process" may be evaluating multiple factors holistically. For example, a "comprehensive decision-making process" may refer to using multi-criteria evaluation for a decision tree and scenario based analysis where multiple migration paths are evaluated, outcomes of the production migrations are compared, and a balanced approach (with respect to product migrations) are identified. As a result, a "comprehensive decision-making process" may refer to a comprehensive process with respect to identifying risk associated with product migrations, bottle-neck associated with product migrations, down-time associated with product migrations, and/or hidden costs associated with product migrations, among other examples, A plan may identify a group of computing devices (of a plurality of computing device) to undergo the product migration, dates and times for the product migration, customized training for using the new product, among other examples. In some examples, the plan may identify one or more first features of the new product to be enabled for a first computing devices and one or more second features of the new product to be enabled for one computing devices. The one or more second features may be different than the one or more first features. Accordingly, the plan may identify a first training for the first computing device and a second training (different than the first training) for the second computing device. The terms "plan," "scenario," "migration scenario," "migration plan," and "strategy" may be used interchangeably.

As shown in FIG. 1, for example, product migration system 110 may include a data processing unit 112, a predictive engine 114, an optimization unit 116, and a cognitive training analysis unit 118. The data processing unit 112 may include one or more computing devices configured to aggregate and preprocess heterogeneous data inputs, including enterprise system usage metrics regarding usage of different products, user role data regarding roles of different users using the different products, and external product reviews of the different products, among other examples. The different products may include the current product and the new product. The heterogeneous data inputs may include structured data and unstructured data. In some examples, the data processing unit 112 may employ natural language processing (NLP) to ascertain sentiment and topical content of the unstructured data. The unstructured data may include the external product reviews, the sentiment may include sentiment regarding the different products, and the topical content may include topics regarding the different products. The data processing unit 112 may employ machine learning algorithms to identify patterns and establish a foundation for scenario modeling of data migration scenarios. In some examples, the machine learning algorithms may include random forest, isolation forest, long short-term memory (LSTM), and/or K-means clustering, among other examples. Random forest may be used to classify failures and/or successes of previous product migrations based on historical data and logs/system configurations files, open issues, among other examples. Random forest may be used for prediction. Isolation forest may be used to identify anomalies in execution of product migrations, such as unexpected downtimes. LSTM may be used to model system changes and predict how product migration sequence may impact performance associated with a product. LSTM may be used to stagger product migration adoption and simulate staggered product migration adoption. K-Means clustering may be used to group product migration scenarios based on similar or shared features, such as system complexity or user roles. K-Means clustering may be used to identify patterns of similarities in outcomes compared with variables/characteristics of the product migration.

The predictive engine 114 may include one or more computing devices that may be configured to process aggregated data to generate a range of product migration scenarios (or plans). Each product migration scenario (also referred to as "scenario") may be associated with cost estimates and risk assessments for migrating to the new product. The cost estimates may include estimates associated with troubleshooting technical issues relating to the new product, licensing for the new product, training for using the new product, among other examples. The engine is further configured to evaluate the impact of migration strategies on enterprise operational efficiency based on historical data trends and projected user interaction patterns.

The optimization unit 116 may include one or more computing devices configured to a utilize a combination of multi-criteria decision analysis algorithms and real-time data inputs to rank and refine the scenarios. The multi-criteria decision analysis algorithms may include analytic hierarchy process (AHP), technique for order preference by similarity to ideal solution (TOPSIS), elimination et choice translating reality (ELECTRE), preference ranking organization method for enrichment evaluation (PROMETHEE), among other examples. The optimization unit 116 is capable of dynamically updating the migration plan in response to ongoing feedback and changing conditions, ultimately facilitating the selection and execution of an optimal migration scenario (or optimal migration plan).

The cognitive training analysis unit 118 may include one or more computing devices configured to evaluate and develop a customized training (or customized training plan) for each user that is to use the new product (e.g., a custom training itinerary for each employee that will require training in order to be proficient in each of the migrated environments under consideration). A customized training (or custom training itinerary) may include detailed schedule outlining a plan for the training, such as topics, activities, timing, among other examples.

The cognitive training analysis unit 118 may take into account previous knowledge and skills demonstrated by each user historically, a difference between existing skill set and skill set for using the new product. Additionally, the cognitive training analysis unit 118 may leverage customized crowdsourced data from other users (associated with other entities) that performed similar skill migration paths (e.g., that received similar training). By leveraging the customized crowdsourced data, the cognitive training analysis unit 118 may derive (or, in other words determine) the customized training impact for each user. This analysis may be performed down to the concept level. For example, the cognitive training analysis unit 118 may determine how easily someone proficient in using feature A from software product X can become proficient in using feature B from software product Y. The individual concept scoring will generate an aggregated migration training impact score and associated cost customized for each user that is part of the product migration and for each migration scenario.

The product migration may be performed on any one or more of the computing devices 120, 122, and 124. In some examples, a group of computing devices may be selected from the computing devices 120, 122, and 124 and the product migration may be performed on the group of computing devices.

Any one or more of the computing devices 120, 122, and 124 may encompass a wide range of computing systems and architectures. In some aspects, these devices may be part of a cloud computing infrastructure, which may include public, private, or hybrid cloud environments. Cloud computing devices may include virtualized resources, such as virtual machines or containers, running on physical hardware in data centers. In some implementations, the computing devices 120, 122, and 124 may be based on mainframe architectures. These systems may be designed for high-volume transaction processing and may include features like redundant components for high availability and reliability.

The computing devices 120, 122, and 124 may include distributed systems, such as those based on microservices architectures. In these systems, applications may be broken down into smaller, independent services that communicate over a network. This architecture may allow for more granular error detection and management at the individual service level. In some implementations, the computing devices 120, 122, and 124 may be edge computing nodes, which process data closer to the source of data generation. In some implementations, the computing devices 120, 122, and 124 may include mobile devices, such as smartphones or tablets, mobile devices, or Internet of Things (IoT) devices, among other examples.

The network 130 may encompass a wide range of communication technologies and architectures to facilitate data exchange between the various components of the computing environment. In some implementations, the network 130 may include traditional wired networks, such as Ethernet-based local area networks (LANs) or fiber optic networks for high-speed, long-distance data transmission. These wired networks may provide reliable, high-bandwidth connections suitable for data-intensive error management tasks. Wireless technologies may also be incorporated into the network 130. For instance, Wi-Fi networks may enable flexible connectivity within office environments or data centers, while cellular networks, including 4G LTE or 5G, may support mobile devices or remote sensors in IoT scenarios. In some cases, the network 130 may leverage satellite communication systems to provide connectivity in remote or hard-to-reach locations. As shown in FIG. 1, product migration system 110 and the computing devices 120, 122, and 124 are connected to the network 130.

Product migration system 110 may implement an AI-driven framework designed to aid tech program and project managers and machine learning users in strategic planning and execution of product migrations. Product migration system 110 may leverage big data, predictive analytics, and user feedback to optimize the product migration.

As indicated above, FIG. 1 is provided as an example. Other examples may differ from what is described with regard to FIG. 1. The number and arrangement of devices shown in FIG. 1 are provided as an example. There may be additional devices (e.g., a large number of devices), fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIGS. 2A-2E are diagrams of an example implementation 200 described herein. As shown in FIGS. 2A-2E, example implementation 200 includes product migration system 110, the computing devices 120, 122, and 124, and an external data source 202. The external data source 202 may include components that generate data and/or that obtain data. The data may include structured data and unstructured data. The external data source 202 may provide data that may be used by product migration system 110 to determine a migration scenario for the product migration to the new product.

In some examples, the external data source 202 may include user feedback 204, IoT devices 206, application program interfaces (APIs) 208, and databases 210. The user feedback 204 may include user feedback regarding the current product and/or the new product. The IoT devices 206 may utilize the current product and the new product and may generate data associated with utilizing the current product and the new product. In some examples, the data may include metrics associated with utilizing the current product and the new product (e.g., a count of data packets received, a count of data packets transmitted, a count of data packets loss, among other examples). The APIs 208 may generate data associated with utilizing the current product and the new product (similar to the user feedback 204). The databases 210 may store data used by the current product and the new product. Additionally, or alternatively, the databases 210 may store metrics associated with utilizing the current product and the new product, as described herein.

Figure 2A:
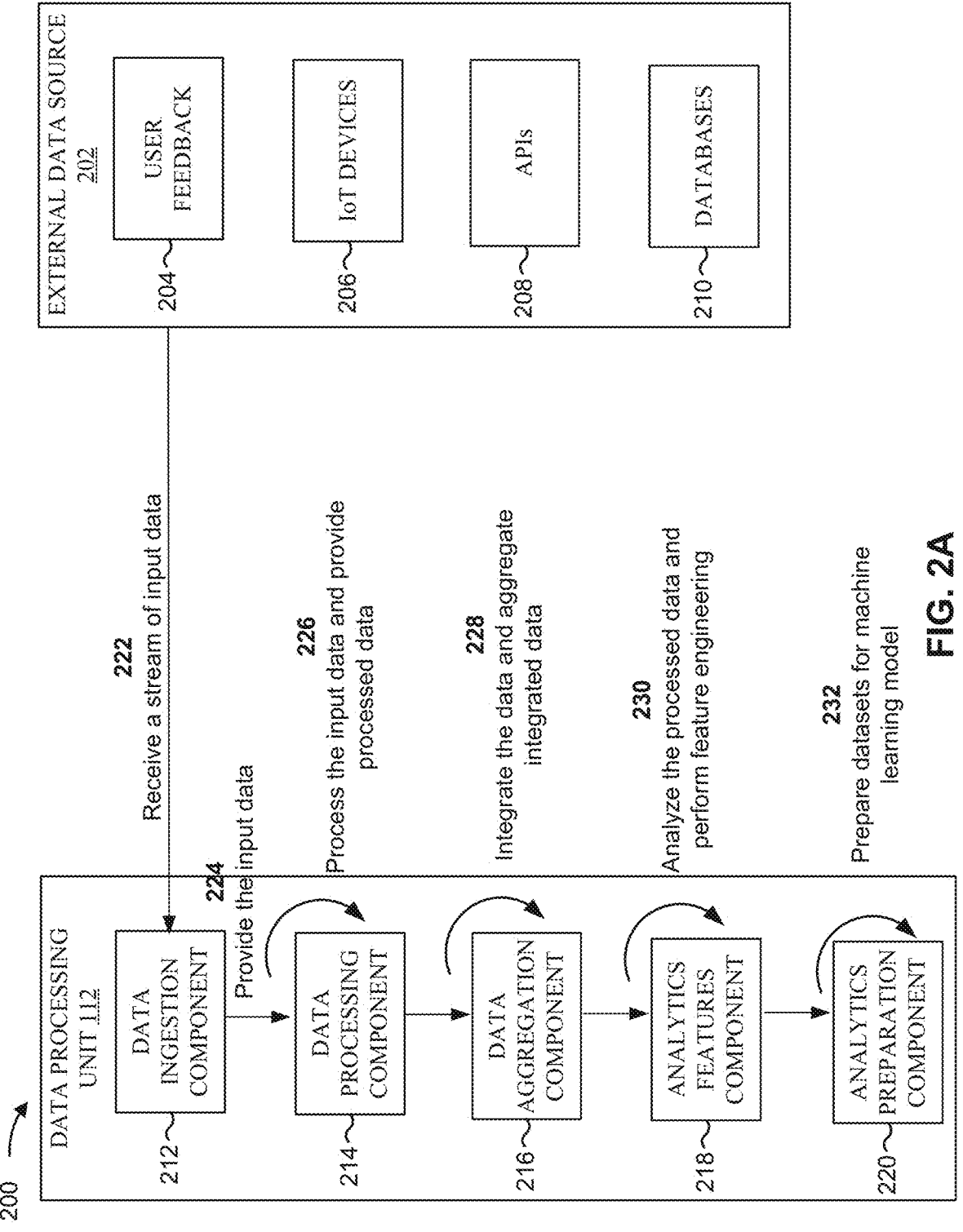
FIGS. 2A-2E are diagrams of an example implementation described herein.

As shown in FIG. 2A, the data processing unit 112 may include a data ingestion component 212, a data processing component 214, a data aggregation component 216, an analytics features component 218, and an analytics preparation component 220. The data ingestion component 212 may obtain to high volumes of diverse data from multiple sources, including databases, IoT devices, user feedback via APIs, and external data streams. In some examples, the data ingestion component 212 may use distributed data streaming platforms that support the creation of reliable, scalable, and real-time data pipelines, ensuring raw data can be efficiently captured and made available for subsequent processing.

The data processing component 214 may clean and pre-process the data obtained from the external data source 202. In some examples, the data processing component 214 may use tools that perform distributed data processing to handle large datasets with ease. In some examples, the data processing may involve standardizing the data to obtain standardized data. Standardizing the data may include standardizing data formats, dealing with missing values from the data, and removing duplicate data. The data processing may enhance the quality of the data and, accordingly, enhance the accuracy of machine learning models used as described herein. In some examples, pre-processing may also include text normalization and feature extraction when handling unstructured data like user feedback or reviews.

The data aggregation component 216 may perform consolidation of data into a structured form suitable for analysis (e.g., analysis by a machine learning model). The data aggregation component 216 may use techniques such as schema mapping, entity resolution, and record linkage to integrate the standardized data, which includes data from disparate data sources. In this regard, as a result, the data aggregation component 216 may create a unified data model that encapsulates the relationships and patterns necessary for detailed analysis, which may assist for mapping out complex product migrations.

The analytics features component 218 may subject processed data (e.g., the data model) to descriptive analytics to summarize to characteristics of the processed data with the assistance of data visualization tools (e.g., for business insights). The analytics features component 218 may perform feature engineering to transform raw data into features that better represent the underlying problem to predictive models, using domain knowledge of the data to create features that make machine learning algorithms work.

The analytics preparation component 220 may prepare the data for predictive analytics. In some examples, preparing the data for predictive analytics may involve the selection of relevant features, reduction of dimensionality where necessary, and normalization of data ranges to ensure that machine learning models can effectively learn from the data. Optimized datasets are then partitioned into training and validation data sets to facilitate the development and evaluation of predictive models.

As described herein, the data processing unit 112 may integrate and synthesize a variety of data sources including user feedback, enterprise usage metrics, and external reviews to construct a detailed current-state analysis. Feeds processed and structured data to the predictive modeling component, enabling the construction of various migration scenarios and cost analyses.

As shown in FIG. 2A, and by reference number 222, the data ingestion component 212 may receive a stream of input data from the external data source 202. The external data source 202 may stream the input data to the data ingestion component 212. The stream of input data may include product information regarding products used by different groups of computing devices. In the context of an entity being a company, the different groups of computing devices may be part of computing devices of different departments, divisions, among other groups. In some examples, the input data may be obtained (or in other words ingested) using a platform that stores and processes streams of data in real-time or near real-time.

In some examples, the stream of input data may include product usage information regarding a usage of products, data regarding roles of different users of the group of computing devices, skill information regarding skills of the users, project information regarding different projects the users are involved in, release dates identify release dates of different projects, timeline information regarding timelines associated with the different projects, IoT collected data indicative of user satisfaction and installation time of products, audio (NLP) and visual (video-feed) data indicative of user sentiment during product migrations and indicative interactions with the new product after migration, training cost information regarding a cost of training for using products, historic user feedback information regarding feedback of users with respect to product migrations, technical issues experienced by the computing devices during product migrations of the products, a downtime of the computing devices during the product migrations, a length of time for troubleshooting the technical problems, and supplier support reviews regarding reviews of a technical support team of the products. The reviews may indicate a responsiveness of the technical support team, an ability to resolve technical issues regarding the products, among other examples. The products may include the current product and the new product.

As shown in FIG. 2A, and by reference number 224, the data ingestion component 212 may provide the input data to the data processing component 214. As shown in FIG. 2A, and by reference number 226, the data processing component 214 may process the input data to generate processed data and provide the processed data. For example, the data processing component 214 may perform distributed data cleaning and normalization. The data processing component 214 may implement a distributed processing system used for big data workloads.

As shown in FIG. 2A, and by reference number 228, the data aggregation component 216 may integrate the data and aggregate the integrated data. For example, the data aggregation component 216 may integrate the processed data to obtain the integrated data and may aggregate the integrated data to obtain the integrated data. In some examples, the data aggregation component 216 may consolidate the processed data for a unified view using schema mapping and record linkage. For example, the data aggregation component 216 may define how data is converted between schemas (e.g., schemas of data from different sources). With respect to record linkage, the data aggregation component 216 may match and merge records from different data sources using one or more record linkage techniques. As a result of the schema mapping and the record linkage, the data aggregation component 216 may generate a unified view for the processed data. For example, the data aggregation component 216 may generate a data model (e.g., the integrated data) that encapsulates the relationships and patterns (for the input data from the different sources) that may be used for a detailed analysis to determine different migration scenarios. The data aggregation component 216 may provide the integrated data to the analytics features component 218.

As shown in FIG. 2A, and by reference number 230, the analytics features component 218 may analyze the integrated data and perform feature engineering on the integrated data. In some examples, the analytics features component 218 may utilize visual analytics and domain knowledge for feature creation. For example, the analytics features component 218 may use one or more visual analytics techniques to analyze the integrated data using visual representations of the integrated data. In some implementations, the analytics features component 218 may transform raw data (from the integrated data) into features that may be used by predictive models to generate different migration scenarios for the product migration. In some examples, the analytics features component 218 may use domain knowledge of the integrated data to create features that facilitate operations of machine learning algorithms. The analytics features component 218 to provide the features and the integrated data to the analytics preparation component 220.

As shown in FIG. 2A, and by reference number 232, the analytics preparation component 220 may prepare datasets for a machine learning model. In some examples, the analytics preparation component 220 may select relevant features (from the features identified by the analytics features component 218), reduction of dimensionality where necessary, and normalization of data ranges to ensure that machine learning models can effectively learn from the integrated data. In some examples, statistical and feature importance techniques and correlation analysis may be used to identify relevant features. For example, gradient boosting or random forest may be used to rank features by importance here. Reduction of dimensionality here will be applied if too many features exist to remove redundant features, a lot of statistical techniques may be used to identify example features with constant values across scenarios. In some examples, the relevant features may be used to create a data set (with meaningful data) that is used to train one or more models described herein. In some examples, cross validation may be used for splitting and training into kl folds and validating, rotating through iterative combinations. Accordingly, implementations described herein may determine whether the selected features generalize well and are not overfit or underfit. If the selected features do not generalize well and are overfit or underfit, changes may be made to the dataset used to train the machine learning model. In some situations, permutations can be performed on the dataset. In some situations, an accuracy of the model may be verified against existing product migration scenario outcomes. In some examples, the analytics preparation component 220 may separate the integrated data into training data and validation data.

Figure 2B:
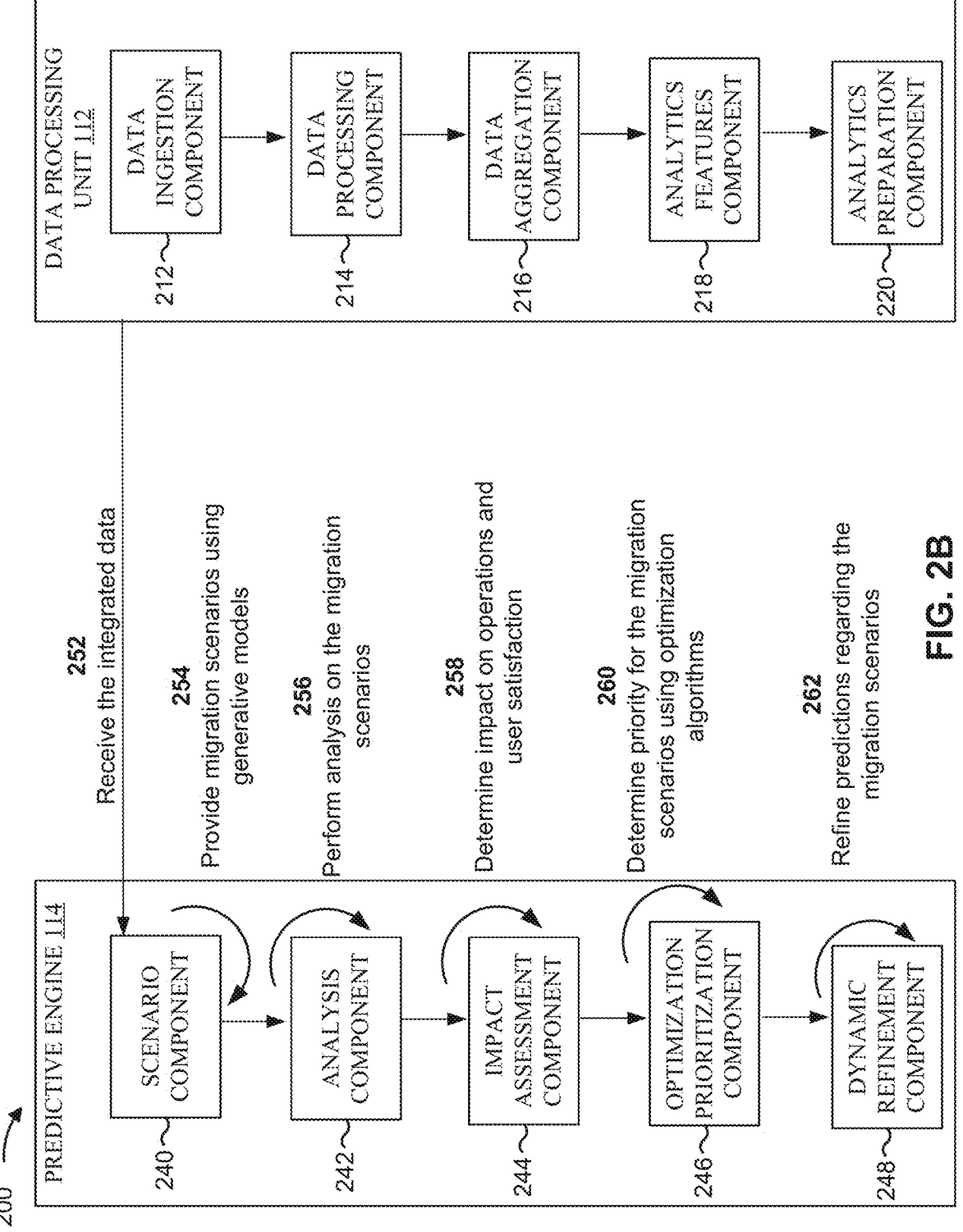

As shown in FIG. 2B, the predictive unit 112 may include a scenario component 240, an analysis component 242, an impact assessment component 244, an optimization prioritization component 246, and a dynamic refinement component 248. The predictive unit 112 may utilize machine learning algorithms to forecast outcomes for the migration scenarios based on historical data, behavioral patterns, and simulated transition strategies. For example, the predictive unit 112 may generate different migration scenarios based on historical data, behavioral patterns, and simulated transition strategies. The behavioral patterns may refer to sentiments of users regarding the current product and/or the new product, may refer to a length of time for training regarding the current product and/or the new product, among other examples. The historical data may include the structured data and the unstructured data. The predictive unit 112 may process decision-relevant models using data insights from the data processing unit 112. The predictive unit 112 may enable strategic planning for product migrations. The predictive unit 112 may provide refined predictive insights to the optimization unit 116, enabling the optimization unit 116 to craft precise migration plans based on potential future states during or after product migration. Implementations described herein may continuously collect data regarding the status of an ongoing product migration. The data collected may include user performance, timelines, and/or risk, among other examples. In this regard, states simulated (e.g., using LSTM) may be combined with reinforcement learning. The model may be continuously updated with the live status to predict the potential future states. The potential future states may be used to identify performance impact, cost estimates, adaption rates, project risks, among other examples.

The scenario component 240 may create a diverse set of potential migration scenarios based on the integrated data (after the data has processed and cleaned). In some examples, the scenario component 240 may use generative modeling techniques to simulate different migration scenarios by varying parameters. The parameters may include a timeline for a product migration, rollout sequence (for the product migration) for different groups of computing devices, and user training schedules. The timeline may include a date, a time, and/or a duration of the product migration. In the context of a company, the different groups of computing devices may belong to different departments/ sections. The purpose of varying parameters is to capture a wide spectrum of possible outcomes to ensure that subsequent analysis covers all plausible migration scenarios.

The analysis component 242 may perform a detailed cost and risk analysis for each migration scenario. In this regard, the analysis component 242 may use algorithms that can estimate indirect costs and calculate direct costs. The estimated indirect costs may include potential downtime or reduced productivity during a period of time during and after the product migration, troubleshooting for technical issues related to product migration, developing different training for different groups of computing devices, among other examples. The direct costs may include licensing and training fees. The analysis component 242 may also factor in the uncertainty related to timeline overruns (with respect to deploying the product migration) and potential barriers to adoption (e.g., of the new product).

The impact assessment component 244 may evaluate the impact of each migration scenario on operational efficiency and user satisfaction. In some examples, the impact assessment component 244 may time-series analysis for operational data (e.g., for the operational efficiency) and sentiment analysis for user feedback. The impact assessment component 244 may forecast how the product migration may affect daily operations and user experience. In some examples, the daily operations and employee experience may be key indicators for an overall success of the product migration.

In some implementations, the optimization prioritization component 246 may use a multi-objective optimization technique to balance various factors, such as cost, risk, and impact associated with each migration scenario. In some situations, the optimization prioritization component 246 may utilize optimization algorithms to rank migration scenarios, thereby identifying potentially most successful migration scenario which strikes an optimal balance between conflicting objectives (e.g., cost, risk, and/or impact).

The dynamic refinement component 248 may set up a feedback loop where the dynamic refinement component 248 may refine predictions based on real-time data and feedback obtained during actual migration activities. The dynamic refinement component 248 may continually update machine learning models to improve accuracy and may apply reinforcement learning to adjust the ranking of the migration scenarios based on outcomes.

Once the product migration is deployed according to a selected migration scenario, the dynamic refinement component 248 may receive real-time data and user feedback regarding the product migration. For example, the dynamic refinement component 248 may receive data regarding an actual duration of the product migration, an amount of time for troubleshooting for technical problems experienced by computing devices during the product migration, an amount of time for configuring the computing devices for the product migration, an amount of downtime due to the product migration, a change in productivity caused by the product migration, and/or the user feedback regarding the product migration, among other examples.

Based on the data, the dynamic refinement component 248 may dynamically adjust the cost, risk, and impact associated with the selected migration scenario and/or with other migration scenarios. In this regard, the dynamic refinement component 248 may adjust a ranking of the migration scenarios. In some situations, a different migration scenario may be selected instead of the selected migration scenario. Accordingly, the dynamic refinement component 248 may select different computing devices for the product migration, may select different dates to initiate the product migration, may enable different features of the product migration and disable existing features of the product migration.

As shown in FIG. 2B, and by reference number 252, the scenario component 240 may receive the integrated data.

For example, the scenario component 240 may receive the integrated data (e.g., the datasets discussed herein) from the data processing unit 112.

As shown in FIG. 2B, and by reference number 254, the scenario component 240 may determine migration scenarios using generative models. For example, the scenario component 240 may determine the migration scenarios based on the integrated data.

As shown in FIG. 2B, and by reference number 256, the analysis component 242 may perform analysis on the migration scenarios. For example, the analysis component 242 may perform analysis on the migration scenarios determined by the scenario component 240. In some implementations, for each migration scenario, the analysis component 242 may perform an analysis to quantify costs of the migration scenario and risks associated with the risk, as described herein. For example, the analysis component 242 may quantify the costs described herein. Additionally, or alternatively, the analysis component 242 may determine risks associated with the migration scenario involving the product migration occurring over a longer period of time and/or risks associated with the product migration experiencing a barrier to adoption (e.g., by users associated with the computing devices).

As shown in FIG. 2B, and by reference number 258, the impact assessment component 244 may determine an impact on operations and user satisfaction. For example, the impact assessment component 244 may determine an impact on operations and user satisfaction for the migration scenarios. For example, for a migration scenario, the impact assessment component 244 may determine technical issues experienced by the computing devices during the product migration, a downtime of the computing devices, a length of time for troubleshooting the technical problems, and/or user feedback regarding the new product.

As shown in FIG. 2B, and by reference number 260, the optimization prioritization component 246 may determine priority for the migration scenarios using optimization algorithms. In some examples, the optimization algorithms may include radiant Descent, Conjugate Gradient, Newton's Method, Simulated Annealing, Genetic Algorithms, Particle Swarm Optimization, Bayesian Optimization, and Quasi-Newton method. The optimization prioritization component 246 may utilize the optimization algorithms to rank the migration scenarios.

As shown in FIG. 2B, and by reference number 262, the dynamic refinement component 248 may refine predictions regarding the migration scenarios. The dynamic refinement component 248 may refine predictions based on actual migration experience through a feedback mechanism. For example, the dynamic refinement component 248 may refine the predictions based on the real-time data (or new real-time data) and user feedback, as described herein. For instance, the dynamic refinement component 248 may adjust a group of computing devices to receive the product migration, may adjust a duration of the product migration, may adjust a training for the group of computing devices, may adjust a sequence for deploying the product migration, among other examples.

Figure 2C:
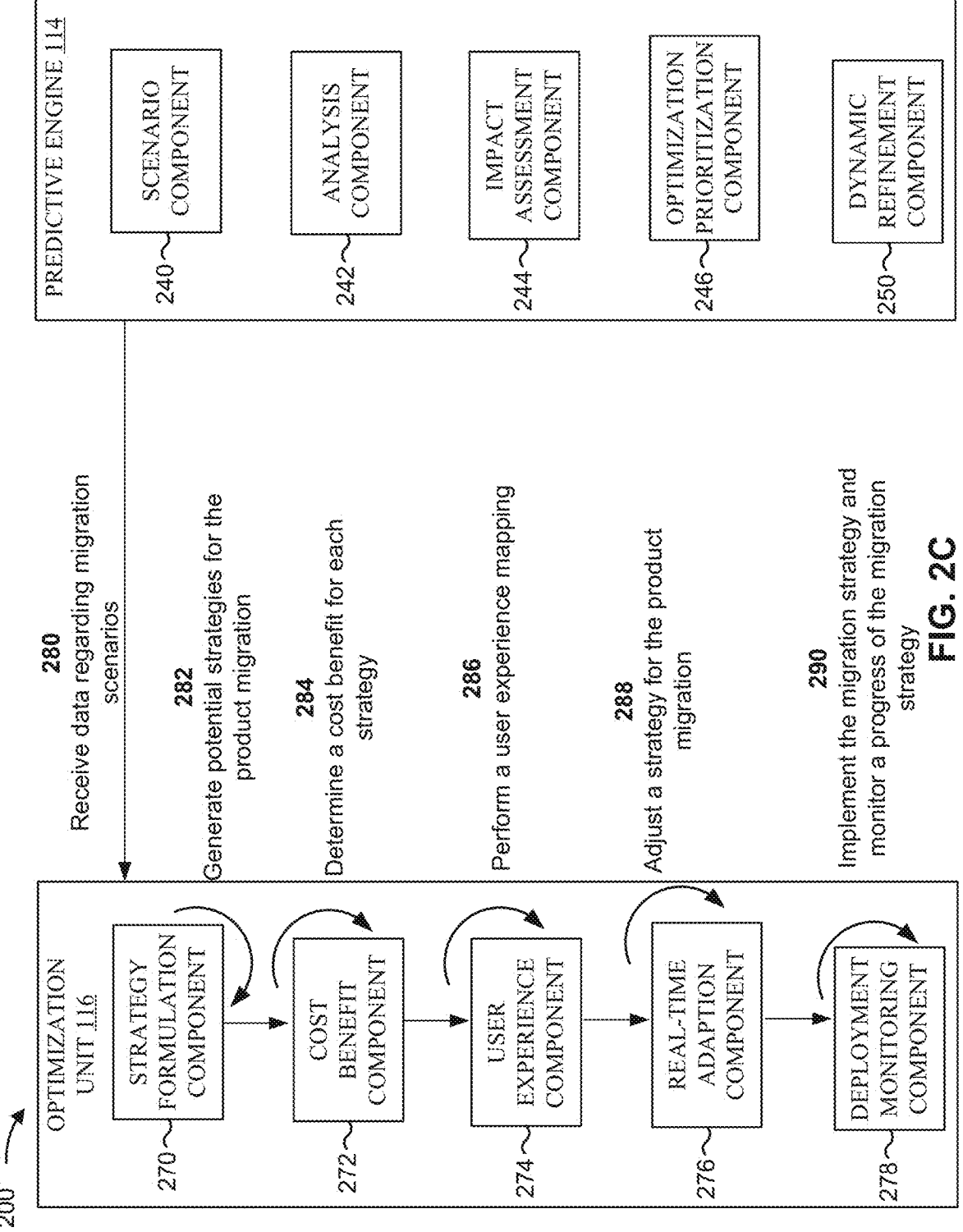

As shown in FIG. 2C, the optimization unit 116 may include a strategy formulation component 270, a cost benefit component 272, a user experience component 274, a real-time adaption component 276, and a deployment monitoring component 278. In some examples, the optimization unit 116 may apply optimization algorithms (described herein) to devise tailored migration strategies that align with organizational objectives and constraints, considering risk, cost, and time. The optimization unit 116 may receive inputs from the predictive models (e.g., of the predictive engine 114) to propose actionable plans and may iteratively refine these plans as new data becomes available from the data processing unit 112.

The strategy formulation component 170 may formulate potential migration strategies for product migration based on outcomes generated by predictive modeling (e.g., of the predictive engine 114). In some examples, the strategy formulation component 170 may employ decision trees and rule-based systems to create a rudimentary map of migration pathways. The strategies may be initially broad, covering a wide range of potential actions, from full-scale product migration (e.g., of all groups of the entity) to incremental rollouts across different groups of the entity (e.g., different departments). The potential actions may include full scale product migration for high readiness and low risk predicted scenarios, phased departmental rollouts for moderate readiness or pilot testing with certain departments first, parallel product migration using old and new licenses simultaneously for a certain adoption period, hybrid product migrations. Each potential action is fine tuned to the product, scenario, user (e.g., employee), requirements, teams, etc. balancing risk, cost, adoption speed, operational stability. For example, for a particular migration scenario, the strategy formulation component 170 may employ decision trees and rule-based systems to determine whether the product migration should occur for all groups of the entity, for one or more groups of the entity, or to determine specific logistics for timing and sequence of migration operations for one or more groups of the entity in order to mitigate or reduce migration impacts or risks, among other examples.

The cost benefit component 272 may perform a cost-benefit analysis, for each migration strategy, to evaluate an economic viability of the migration strategy. The cost benefit component 272 may integrate with a project management systems to extract detailed cost data, and may employ linear programming to optimize a budget allocation while achieving a desired migration outcomes, ensuring that financial aspects align with strategic goals.

The user experience component 274 may perform a user experience mapping process, which models the anticipated user experience based on predictive insights regarding user adoption and training needs. In some examples, based on the user experience mapping process, the user experience component 274 may determine (or predict) needs, concerns, challenges to adaptation and/or hesitation of users regarding the new product. The user experience component 274 make use of multi-layer perceptron neural networks to synthesize complex user feedback data and translate the user feedback into actionable user experience strategies for the migration plan. The user experience component 274 can then enable customized training assistance based on differences in usage between a previous and a new software or hardware product. The training assistance can further be optimized to a learning style most effective for a particular user. In some embodiments, the system may include a combination of on-screen text, audio or video guidance overlays to assist the user in adapting to the different workflow of the new product.

The real-time adaption component 276 may accommodate changing circumstances during the product migration. The changing circumstances may include delay in deploying the product migration, delay in troubleshooting the deployment, adjustment of training of the new product, barriers to adoption, among other examples. In some examples, the real-time adaption component 276 may leverage dynamic systems and control theory to adjust the migration strategy on-the-fly, based on continuous input from monitoring tools and feedback mechanisms. By adjusting the migration strategy, the real-time adaption component 276 may maintain an alignment of the product migration with business objectives.

The deployment monitoring component 278 may integrate the strategy with deployment schedules and may set up comprehensive monitoring to track a progress of a product migration. In some implementations, the deployment monitoring component 278 may use an event-driven architecture to register and respond to significant milestones and incidents. The deployment of the product migration may adhere to information technology infrastructure library (ITIL) standards for best practice in information technology service management, and big data analytics are employed for ongoing monitoring and reporting.

As shown in FIG. 2C, and by reference number 280, the optimization unit 116 may receive data regarding migration scenarios. For example, the optimization unit 116 may receive the data regarding the migration scenarios from the predictive engine 114.

As shown in FIG. 2C, and by reference number 282, the strategy formulation component 270 may generate potential strategies for the product migration. For example, for each migration scenario, the strategy formulation component 270 may generate a strategy for the product migration. The strategy may identify one or more groups of computing devices to receive the product migration, a date and time for each group of computing devices, one or more features to be enabled for the new product for each group of computing devices. In some features, the one or more groups may be identified based user roles of users associated with the computing devices. For example, a user with a role of executive may be selected for the product migration before a user with a role of manager. As another example, a user with a role of IT manager may have all features of the new product enabled whereas a user with a role of first year associate may have less than an entirety of the features enabled.

As shown in FIG. 2C, and by reference number 284, the cost benefit component 272 may determine a cost and a benefit of each strategy, as described herein.

As shown in FIG. 2C, and by reference number 286, the user experience component 274 may perform a user experience mapping. For example, for each strategy, the user experience component 274 may determine (or predict) needs, concerns, and/or hesitations of users regarding the new product.

As shown in FIG. 2C, and by reference number 288, the real-time adaption component 276 may adjust a strategy for the product migration. For example, the product migration may be deployed according to a selected strategy of the different strategies generated by the strategy formulation component 270. During the deployment of the product migration, the real-time adaption component 276 may receive data regarding delay in deploying the product migration, delay in troubleshooting the deployment, adjustment of training of the new product, barriers to adoption of the new product, difficulties of the technical support team addressing technical issues regarding the new product. The real-time adaption component 276 may adjust the strategy based on the data. As an example, the real-time adaption component 276 may suspend the deployment of one or more current features of the new product and may initiate the deployment of one or more additional features of the new product. As another example, the real-time adaption component 276 may deactivate the one or more features prior to training and activate the one or more features after training. As yet another example, the real-time adaption component 276 may suspend the deployment of the product migration on a current group of computing devices and may initiate the deployment of the product migration on a new group of computing devices. As yet another example, the real-time adaption component 276 may change a timeline for the product migration, may change a number of computing devices to receive the product migration, may change types of users (e.g., user roles) that receive the product migration, among other examples.

As shown in FIG. 2C, and by reference number 290, the deployment monitoring component 278 may implement the migration strategy and monitor a progress of the migration strategy.

In some examples, the optimization unit 116 may generate an output that identifies multiple potential product migration strategies, each with their own costs, and benefits. Additionally, or alternatively, the optimization unit 116 may generate contextual information regarding an impact of a product migration during a particular planned time-period on individual departments, employees, and enterprise offerings. Additionally, the optimization unit 116 may generate recommendations regarding next steps in new product adoption/migration and training, onboarding procedures.

In some embodiments, product migration system 110 may include a cognitive training analysis component that determines accurate training transition paths, estimated cost and timelines of training customized for each user for each scenario being considered. In some examples, the training may be determined based on a skill of the user and/or a role of the user. Information regarding the training paths may be provided to the predictive engine 114 in order to enhance the accuracy of the cost modeling and impact of various scenarios considered.

Figure 2D:
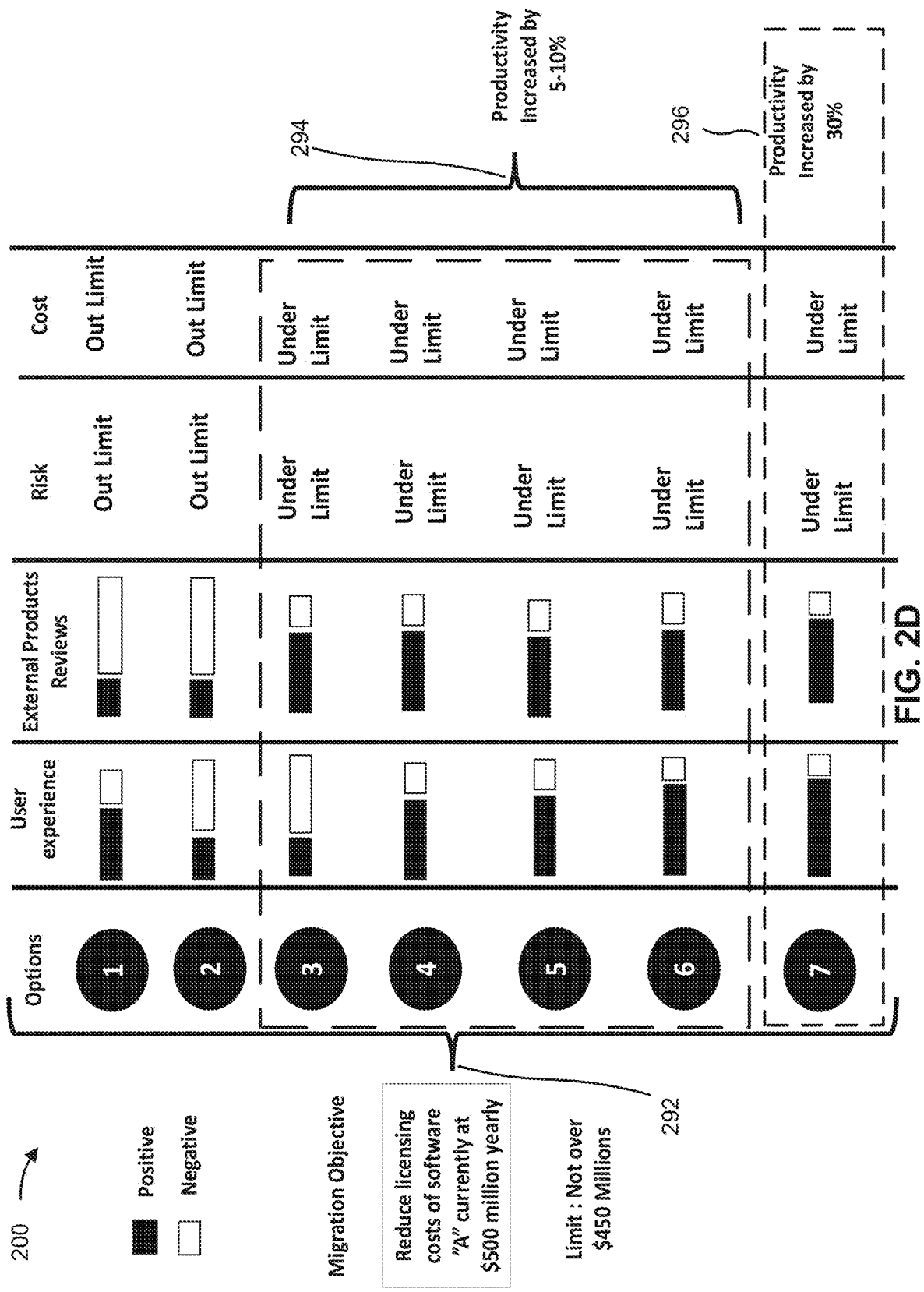

As shown in FIG. 2D, product migration system 110 may determine different scenarios for the product migration. In this regard, consider an entity (e.g., a company) that is trying to reduce licensing costs. The entity may use product migration system 110 to quickly aggregate and preprocess heterogeneous data inputs, including but not limited to enterprise system usage metrics, user role data, and external product reviews. Using NLP, product migration system 110 may ascertain sentiment and topical content of unstructured data and may use machine learning algorithms to identify patterns and establish a foundation for scenario modeling.

From the scenario generation module, and as shown FIG. 2 product migration system 110 may generate 7 scenarios 292 to consider. In this regard, product migration system 110 may eliminate all the other scenarios that contain incompatible components or combinations known to be problematic. The cost and risk analysis module further refined the above 7 scenarios 292 into 5 resulting scenarios (e.g., scenarios 294 and a scenario 296) where the cost and risks were within limits defined by the company. The impact assessment component 244 may use time-series analysis and including user feedback to identify that the scenario 296. While a first scenario (e.g., scenario 3) may be little bit less expensive, the first scenario may have a significant impact to the employee experience helping to remove this scenario from consideration, as shown in FIG. 2D. From the remaining 4 scenarios, the optimization and prioritization module may generate scores for cost, risk, impact and optimal timeline. In the end, the scenario 296 may stand above all the rest, showing a low risk score, a modest cost savings and minimal impact. While the scenario 296 may not save a substantial amount in licensing costs, the productivity would increase by 30% in the following year due to the well balanced combination of software that was chosen and ability of employees to actually get more accomplished using this system than the previous system.

Figure 2E:
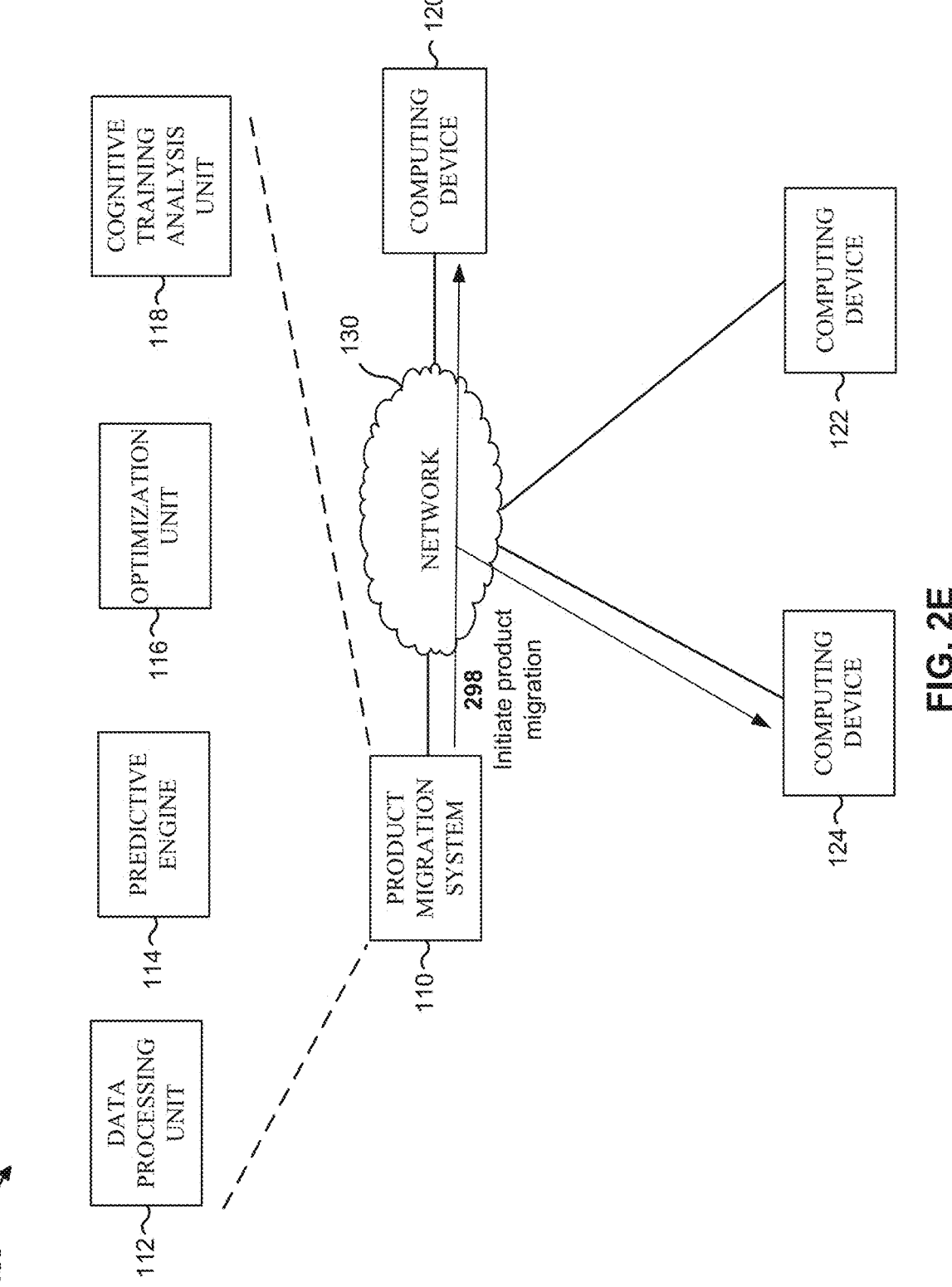

As shown in FIG. 2E, and by reference number 298, product migration system 110 may initiate the product migration. As part of initiating the product migration, product migration system 110 may configure different computing devices (e.g., the computing device 120, the computing device 122, and the computing device 124). As part of configuring the different computing devices, product migration system 110 may allocate random access memory, may configure swap files, may configure disk space, among other examples. In some examples, depending on the different trainings for the computing devices and/or the different roles of users of the computing devices, product migration system 110 may configure the computing devices in different manners.

As indicated above, FIGS. 2A-2E are provided as an example. Other examples may differ from what is described with regard to FIGS. 2A-2E. There may be additional devices (e.g., a large number of devices), fewer devices, different devices, or differently arranged devices than those shown in FIGS. 2A-2E. Furthermore, two or more devices shown in FIGS. 2A-2E may be implemented within a single device, or a single device shown in FIGS. 2A-2E may be implemented as multiple, distributed devices. Additionally, or alternatively, a set of devices (e.g., one or more devices) shown in FIGS. 2A-2E may perform one or more functions described as being performed by another set of devices in FIGS. 2A-2E are.

Figure 3:
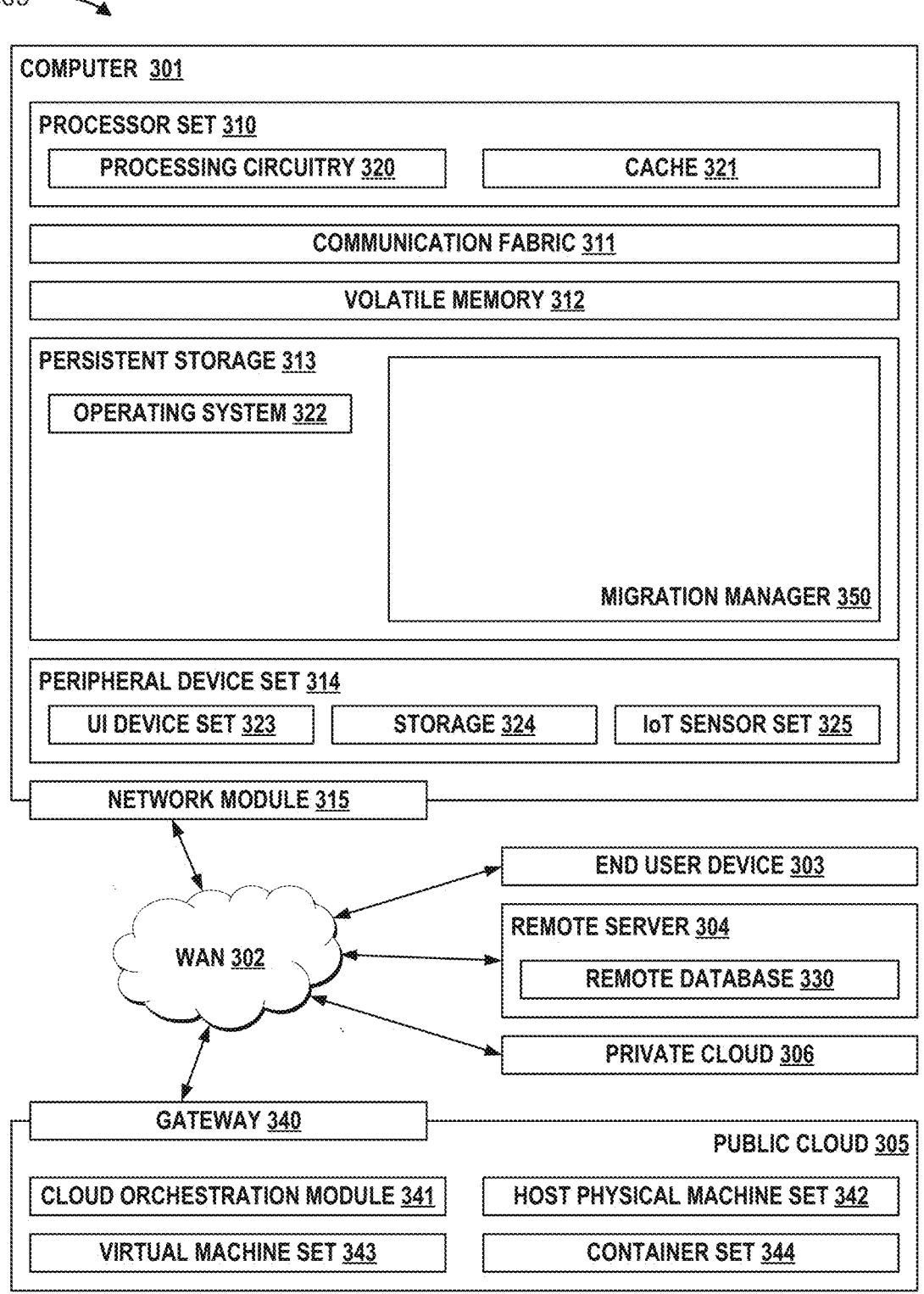
FIG. 3 is a diagram of an example computing environment in which systems and/or methods described herein may be implemented.

FIG. 3 is a diagram of an example computing environment 300 in which systems and/or methods described herein may be implemented. Various aspects of the present disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment is a term used in the present disclosure to describe any set of one, or more, storage media (also called "mediums") collectively included in a set of one, or more, storage devices that collectively include machine readable code corresponding to instructions and/or data for performing computer operations specified in a given claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as a load balancer, shown in block 350. In addition to block 350, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 350, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 350 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in block 350 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
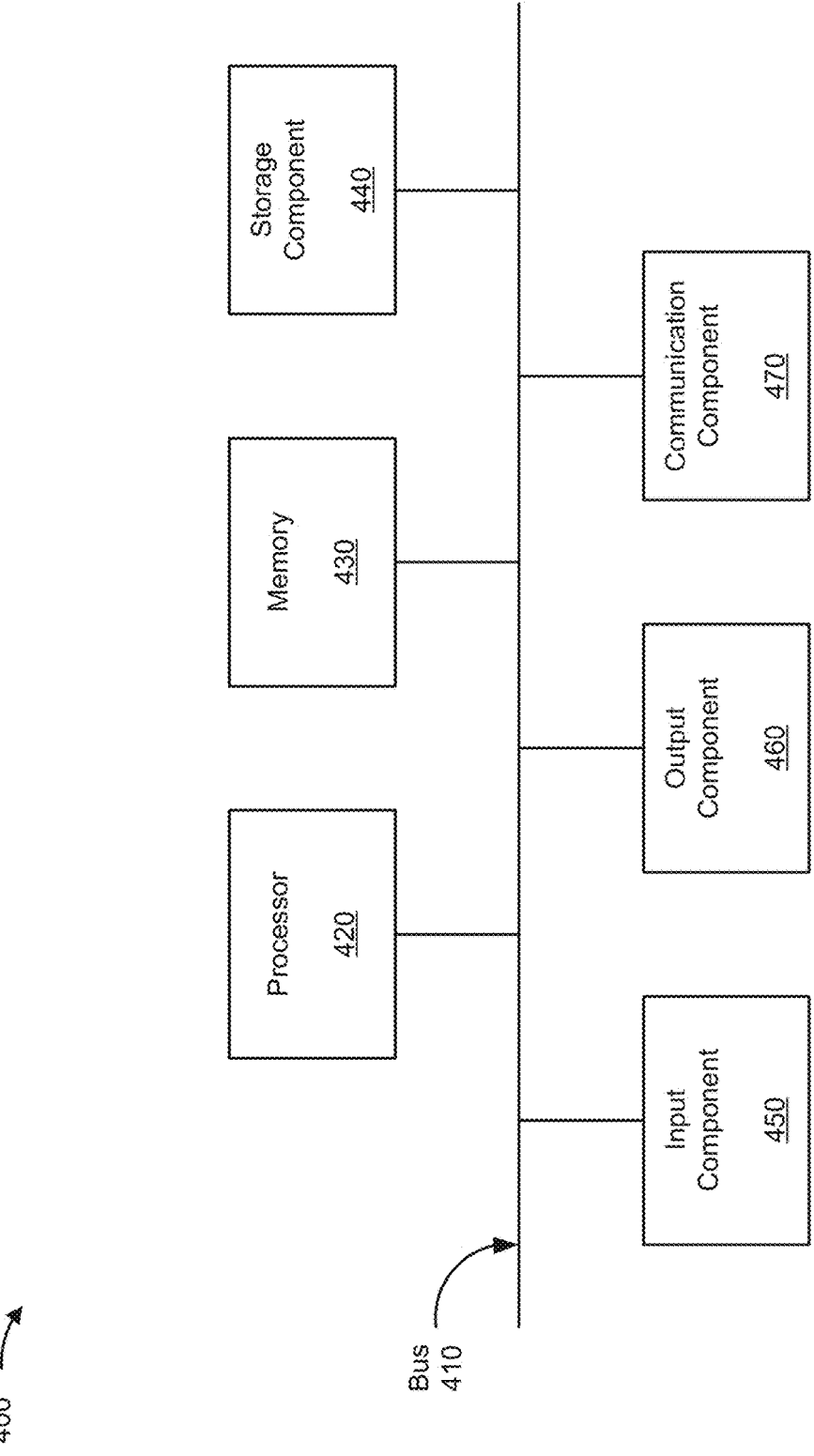
FIG. 4 is a diagram of example components of one or more devices of FIG. 1.

FIG. 4 is a diagram of example components of a device 400, which may implement one or more components of the computing environment 100. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with product migration as described herein. In some implementations, one or more process blocks of FIG. 5 may be performed by a product migration system (e.g., product migration system 110). Additionally, or alternatively, one or more more process blocks of FIG. 5 may be performed by one or more components of device 400, such as processor 420, memory 430, storage component 440, input component 450, output component 460, and/or communication component 470.

As shown in FIG. 5, process 500 may include obtaining structured data and unstructured data, from a plurality of sources, for a product migration to a new product (block 510). For example, the product migration system may obtain structured data and unstructured data, from a plurality of sources, for a product migration to a new product.

As shown in FIG. 5, process 500 may include standardizing the structured data and the unstructured data to obtain standardized data (block 520). For example, the product migration system may standardize the structured data and the unstructured data to obtain standardized data.

As shown in FIG. 5, process 500 may include generating a data model by processing the standardized data (block 530). For example, the product migration system may generate a data model by processing the standardized data, as described above.

As shown in FIG. 5, process 500 may include utilizing a machine learning model to forecast outcomes of the product migration based on the data model (block 540). For example, the product migration system may utilize a machine learning model to forecast outcomes of the product migration based on the data model, as described above.

As shown in FIG. 5, process 500 may include providing a plurality of refined predictive insights to a strategy optimization component (block 550). For example, the product migration system may provide a plurality of refined predictive insights to a strategy optimization component.

As shown in FIG. 5, process 500 may include configuring a group of computing devices for the product migration (block 560). For example, the product migration system may configure a group of computing devices for the product migration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method for providing content, the computer-implemented method comprising:

obtaining, via a network and from a plurality of sources, structured data and unstructured data for a product migration to a new product, wherein the structured data and the unstructured data are obtained, using a data ingestion component, to predict a success of the product migration;

standardizing the structured data and the unstructured data to obtain standardized data, wherein standardizing the structured data and the unstructured data includes standardizing formats, addressing missing values, and removing duplicate data;

generating a data model by processing the standardized data;

utilizing a machine learning model to determine migration scenarios for the product migration and to forecast outcomes for the migration scenarios based on the data model;

providing a plurality of refined predictive insights to a strategy optimization component, wherein the strategy optimization component determines migration strategies for the migration scenarios based on potential future states associated with the product migration; and configuring a group of computing devices, from a plurality of computing devices, for the product migration, wherein the group of computing devices is selected based on the migration strategies.

2. The computer-implemented method of claim 1, wherein obtaining the structured data and the unstructured data comprises:

obtaining system usage metrics regarding usage of products, user role data of roles of users of the products, and product reviews of the products.

3. The computer-implemented method of claim 1, further comprising:

aggregating the standardized data to obtain aggregated data; and processing the aggregated data to generate different migration scenarios for the product migration, wherein a migration scenario is associated with a cost estimate and a risk assessment.

4. The computer-implemented method of claim 3, further comprising at least one of:

ranking the different migration scenarios based on multi-criteria decision analysis algorithms and real-time data inputs during the product migration; or refining the different migration scenarios based on the multi-criteria decision analysis algorithms and the real-time data inputs.

5. The computer-implemented method of claim 1, further comprising:

developing one or more customized trainings, for using the new product, for one or more computing devices of the group of computing devices, wherein a customized training, developed for a computing device, is developed based on historical data regarding knowledge and skills of a user of the computing device.

6. The computer-implemented method of claim 1, further comprising:

retraining the machine learning model based on real-time data obtained during the product migration; and refining the forecasted outcomes of the product migration using the machine learning model retrained based on the real-time data obtained during the product migration.

7. The computer-implemented method of claim 1, further comprising:

utilizing the machine learning model to model anticipated user experience based on predictive insights regarding user adoption of the new product and regarding training for using the new product.

8. A computer program product comprising:

one or more computer-readable storage media; and program instructions stored on the one or more computer readable storage media to perform operations comprising:

obtaining, via a network and from a plurality of sources, structured data and unstructured data for a product migration to a new product;

standardizing the structured data and the unstructured data to obtain standardized data;

generating a data model by processing the standardized data;

utilizing a machine learning model to forecast outcomes of the product migration based on the data model;

providing a plurality of refined predictive insights to a strategy optimization component, wherein the strategy optimization component determines migration strategies based on potential future states associated with the product migration; and configuring a group of computing devices, from a plurality of computing devices, for the product migration, wherein the group of computing devices is selected based on the migration strategies.

9. The computer program product of claim 8, wherein the operations further comprise:

obtaining system usage metrics, user role data, and product reviews, wherein the structured data and the unstructured data include the system usage metrics, user role data, and product reviews.

10. The computer program product of claim 8, wherein the operations further comprise:

processing aggregated data to generate different migration scenarios for the product migration, wherein a migration scenario is associated with a cost estimate and a risk assessment.

11. The computer program product of claim 10, wherein the operations further comprise:

ranking the different migration scenarios based on multi-criteria decision analysis algorithms and real-time data inputs during the product migration; or refining the different migration scenarios based on multi-criteria decision analysis algorithms and real-time data inputs.

12. The computer program product of claim 8, wherein the operations further comprise:

developing one or more customized trainings, for using the new product, for one or more computing devices of the group of computing devices, wherein a customized training, developed for a machine, is developed based on historical data regarding knowledge and skills of a user of the machine.

13. The computer program product of claim 8, wherein the operations further comprise at least one of:

retraining the machine learning model based on real-time data obtained during the product migration; or refining the forecasted outcomes of the product migration using the machine learning model retrained based on real-time data obtained during the product migration.

14. The computer program product of claim 8, wherein the operations further comprise:

utilizing the machine learning model to model anticipated user experience based on predictive insights regarding user adoption of the new product and regarding training for using the new product.

15. A computer system comprising:

one or more computer-readable storage media;

a processor set; and program instructions stored on the one or more computer-readable storage media to cause the processor set to perform operations comprising:

establishing a data ingestion framework, for a product migration to a new product, to obtain structured data and unstructured data from a plurality of sources, wherein the structured data and the unstructured data are obtained to predict a success of the product migration;

standardizing the structured data and the unstructured data to obtain standardized data, wherein standardizing the structured data and the unstructured data includes standardizing formats, addressing missing values, and removing duplicate data;

generating a data model by processing the standardized data;

utilizing a machine learning model to forecast outcomes of the product migration based on the data model;

providing a plurality of refined predictive insights to a strategy optimization component, wherein the strategy optimization component determines migration strategies based on potential future states; and configuring a group of computing devices, from a plurality of computing devices, for the product migration.

16. The computer system of claim 15, wherein the operations further comprise:

utilizing the machine learning model to model anticipated user experience based on predictive insights regarding user adoption of the new product and regarding training for using the new product.

17. The computer system of claim 15, wherein the operations further comprise at least one of:

retraining the machine learning model based on real-time data obtained during the product migration; or refining the forecasted outcomes of the product migration using the machine learning model retrained based on real-time data obtained during the product migration.

18. The computer system of claim 15, wherein the operations further comprise at least one of:

developing one or more customized trainings, for using the new product, for one or more computing devices of the group of computing devices, wherein a customized training, developed for a machine, is developed based on historical data regarding knowledge and skills of a user of the machine.

19. The computer system of claim 15, wherein the operations further comprise:

obtaining system usage metrics, user role data, and product reviews, wherein the structured data and the unstructured data include the system usage metrics, user role data, and product reviews.

20. The computer system of claim 15, wherein the operations further comprise:

processing aggregated data to generate different migration scenarios for the product migration, wherein a migration scenario is associated with a cost estimate and a risk assessment.

* * * * *